United States Patent
Caushi

(10) Patent No.: US 10,140,116 B2
(45) Date of Patent: Nov. 27, 2018

(54) IN-VEHICLE AUXILIARY MEMORY STORAGE

(71) Applicant: FORD GLOBAL TECHNOLOGIES, LLC, Dearborn, MI (US)

(72) Inventor: Brunilda Bleta Caushi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 15/275,577

(22) Filed: Sep. 26, 2016

(65) Prior Publication Data

US 2018/0088931 A1    Mar. 29, 2018

(51) Int. Cl.
*G06F 9/445* (2018.01)
*G06F 9/44* (2018.01)
*G06F 8/654* (2018.01)
*G06F 17/30* (2006.01)
*H04L 29/08* (2006.01)

(52) U.S. Cl.
CPC ........ *G06F 8/654* (2018.02); *G06F 17/30864* (2013.01); *H04L 67/12* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,463,373 B2 * | 10/2002 | Suganuma | B60R 16/0232 303/112 |
| 8,700,726 B2 | 4/2014 | Saeed | |
| 9,720,680 B2 * | 8/2017 | Diedrich | G06F 8/65 |
| 2004/0088087 A1 * | 5/2004 | Fukushima | B60R 16/0231 701/29.6 |
| 2005/0256614 A1 * | 11/2005 | Habermas | G06F 8/65 701/1 |
| 2009/0319864 A1 * | 12/2009 | Shrader | G06F 11/1012 714/758 |
| 2010/0153532 A1 * | 6/2010 | Ozawa | H04L 67/125 709/223 |
| 2010/0275184 A1 * | 10/2010 | Nir | G06F 11/3688 717/125 |
| 2013/0132939 A1 * | 5/2013 | Murata | H02J 7/041 717/173 |

(Continued)

*Primary Examiner* — Insun Kang
(74) *Attorney, Agent, or Firm* — Jennifer M. Stec; Brooks Kushman P.C.

(57) ABSTRACT

An embedded modem communicates over a vehicle bus with controllers that each include data storage. The embedded modem queries the controllers over the bus to identify controllers having available storage, such that if the available storage is located on a priority controller, the embedded modem sends received data over the bus to the priority controller. Otherwise, if the available storage is available on a non-priority controller, the embedded modem send the data over the bus to the non-priority controller. The embedded modem queries the controllers over the bus to confirm that the controllers storing the received data are available for data offload, and responsive to the confirmation, requests the stored data over the bus and transmits the stored data over a wide-area network to a telematics server.

13 Claims, 3 Drawing Sheets

(56) References Cited

U.S. PATENT DOCUMENTS

| | | | |
|---|---|---|---|
| 2013/0198737 A1* | 8/2013 | Ricci | G06F 13/14 |
| | | | 717/174 |
| 2013/0212571 A1* | 8/2013 | Matsuura | G06F 8/65 |
| | | | 717/170 |
| 2014/0310702 A1* | 10/2014 | Ricci | H04W 48/04 |
| | | | 717/173 |
| 2015/0007155 A1* | 1/2015 | Hoffman | G06F 8/65 |
| | | | 717/168 |
| 2015/0277942 A1* | 10/2015 | Rork | G06F 8/65 |
| | | | 701/31.4 |
| 2016/0013934 A1* | 1/2016 | Smereka | G06F 21/572 |
| | | | 713/171 |
| 2016/0101728 A1 | 4/2016 | Chan | |
| 2016/0202966 A1* | 7/2016 | Vangelov | G06F 8/665 |
| | | | 717/172 |
| 2016/0264071 A1* | 9/2016 | Ujiie | B60R 16/023 |
| 2016/0335073 A1* | 11/2016 | Hong | G06F 8/65 |
| 2017/0124871 A1* | 5/2017 | Sunadham | H04Q 9/00 |
| 2017/0171051 A1* | 6/2017 | Joo | H04L 43/0882 |
| 2017/0192770 A1* | 7/2017 | Ujiie | B60R 16/02 |
| 2017/0315797 A1* | 11/2017 | Vangelov | G06F 8/65 |

\* cited by examiner

IN-VEHICLE AUXILIARY MEMORY STORAGE

TECHNICAL FIELD

Aspects of the disclosure generally relate to use of auxiliary memory storage within the vehicle.

BACKGROUND

Some vehicles today include an embedded modem. The modem may be used to allow the vehicle to send data to remote systems over a network connection. In some cases, the modem may perform logging of vehicle information. To do so, data may be received from in-vehicle sources, stored to a memory of the modem, and then offloaded from the modem to the remote system. In other examples, the modem may receive software updates from the remote system, and may use those updates to adjust software, firmware, or settings of the vehicle.

SUMMARY

In one or more illustrative embodiments, a system includes an embedded modem, in communication over a vehicle bus with controllers each including data storage, programmed to query the controllers over the bus to identify controllers having available storage, if the available storage is located on a priority controller, send received data over the bus to the priority controller, and otherwise, if the available storage is available on a non-priority controller, send the data over the bus to the non-priority controller.

In one or more illustrative embodiments, a system includes an embedded modem, in communication over a vehicle bus with controllers each including data storage, programmed to store data to the controllers over the vehicle bus, query the controllers over the bus to confirm that the controllers storing the data are available for data offload, and responsive to the confirmation, request the stored data over the bus and transmit the stored data over a wide-area network to a telematics server.

In one or more illustrative embodiments, a method includes querying by an embedded modem over a vehicle bus to identify controllers having available storage; sending data from the embedded modem over the bus for storing to a controller indicated as having the available storage; and responsive to a query of the controller as being available to provide the data, request the stored data over the bus and transmit the stored data over a wide-area network to a telematics server.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles include embedded modems to connect to networks external to the vehicle. In order to collect diagnostic information from a vehicle, the embedded modem may save data in its data storage, and transmit the stored data to a telematics server. The transmission of data may be performed responsive to various conditions. For instance, the transmission may be performed periodically, responsive to a receipt of a message from the telematics server, or upon filling of the storage to capacity. Such solutions, however, place a storage burden on the embedded modem to have storage capacity sufficient to maintain all vehicle data to be offloaded as well as to have storage sufficient to execute core modem functionality or other commands such as over-the-air updates.

An improved embedded modem may be configured to act as a router within the vehicle network to offload data from modem storage to available storage capacity of other in-vehicle controllers. In one aspect, the modem may be configured to communicate with the controllers to query the controllers for information indicative of available storage at the queried components. For those controllers that report available capacity responsive to the query, the embedded modem may package off and send data to those controllers to make use of their available storage. For instance, the embedded modem may package the data to be offloaded for storage, and send the data to those controllers over various protocols (e.g., WiFi, Ethernet, High-Speed Controller Area Network (HS-CAN, etc.).

The embedded modem may be further configured to determine a target time to transfer the data to the telematics server. In doing so, the embedded modem may account for the tasks being executed by the vehicle. For instance, if an in-vehicle controller is performing a task in support of the vehicle being in a motive mode, the embedded modem may delay the transfer of data from the controller to avoid adding a resource burden to the controller.

In cases where no components have available storage, or in cases where insufficient storage is available, the embedded modem may be further configured to store a subset of data instead of all the data to be sent to the telematics server. In an example, the embedded modem may perform decimation of diagnostic data or may limit low priority data offload. Further details are discussed in detail herein.

Figure 1:
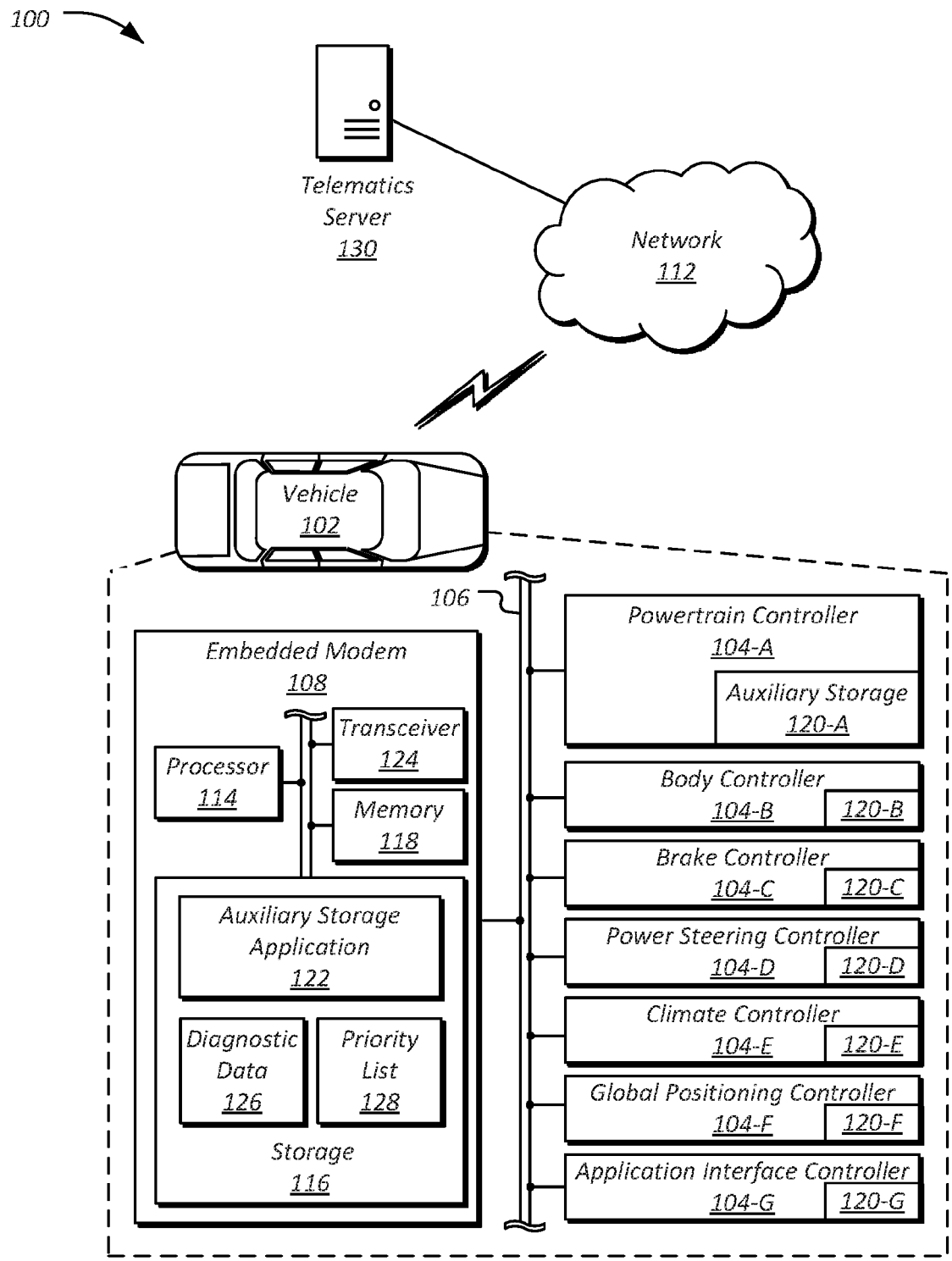
FIG. 1 illustrates an example system for using auxiliary storage of vehicle electronic control units to provide additional storage capacity to an embedded modem of a vehicle.

FIG. 1 illustrates an example system 100 for using auxiliary storage 120 of vehicle electronic control units (ECUs) 104 to provide additional storage capacity to an embedded modem 108 of a vehicle 102. The system 100 includes a vehicle 102 having a plurality of electronic control units (ECUs) 104 in communication with one another and with an embedded modem 108 over one or more vehicle buses 106. The embedded modem 108 includes storage 116 for maintaining data (e.g., diagnostic data 126, a priority list 128, software updates, etc.), a processor 114, memory 118, and a transceiver 124. The ECUs 104 may each include an amount of auxiliary storage 120. Using the embedded modem 108, the vehicle 102 may communicate with one or more telematics servers 136 over a wide-area network 112. While an example system 100 is shown in FIG. 1, the example components as illustrated are not intended to be limiting.

Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As the type and configuration of vehicle 102 may vary, the capabilities of the vehicle 102 may correspondingly vary. As some other possibilities, vehicle 102 may have different capabilities with respect to passenger capacity, towing ability and capacity, and storage volume.

The vehicle 102 may include a plurality of ECUs 104 configured to perform and manage various vehicle 102 functions under the power of the vehicle battery and/or drivetrain. The ECUs 104 may be computing devices including hardware processors configured to execute software and/or firmware to perform the operations of the ECUs 104 discussed herein. As depicted in the illustrated example, the vehicle ECUs 104 are represented as discrete ECUs 104-A through 104-G. However, the vehicle ECUs 104 may share physical hardware, firmware, and/or software, such that the functionality from multiple ECUs 104 may be integrated into a single ECU 104, and the functionality of various such ECUs 104 may be distributed across a plurality of ECUs 104.

As some non-limiting vehicle ECUs 104 that may be included within the vehicle 102: a powertrain controller ECU 104-A may be configured to provide control of engine operating components; a body controller ECU 104-B may be configured to manage various power control functions such as exterior lighting, interior lighting, keyless entry, remote start, and point of access status verification; a brake controller ECU 104-C may be configured to provide control of braking and/or stability control components; a power steering controller ECU 104-D may be configured to provide control of electronic or pneumatic steering assist and/or drift compensation functions; a climate control management ECU 104-E may be configured to provide control of heating and cooling system components (e.g., compressor clutch, blower fan, temperature sensors, etc.) to manage climate in cargo and/or passenger compartments; a global positioning system (GPS) ECU 104-F may be configured to provide vehicle location information; and an application interface controller 104-G may be configured to support voice command and BLUETOOTH interfaces with the driver and driver carry-on devices, receive user input via various buttons or other controls, and provide vehicle status information to a driver or other vehicle 102 occupants. An example application interface controller 104-G may be the SYNC system provided by FORD MOTOR COMPANY of Dearborn, Mich.

The vehicle bus 106 may include various methods of communication available between the vehicle ECUs 104, as well as between the embedded modem 108 and the vehicle ECUs 104. As some non-limiting examples, the vehicle bus 106 may include one or more of a vehicle controller area network (CAN), an Ethernet network, and a media oriented system transfer (MOST) network.

The embedded modem 108 may include a cellular modem or other network transceiver 110 configured to facilitate communication over the communications network 112 between the vehicle 102 and other devices of the system 100. The network 112 may include one or more interconnected communication networks such as the Internet, a cable television distribution network, a satellite link network, a local area network, a wide area network, and a telephone network, as some non-limiting examples. Using the embedded modem 108, the vehicle 102 may be able to send outgoing data from the vehicle 102 to network destinations on the network 112, and receive incoming data to the vehicle 102 from network destinations on the network 112.

The embedded modem 108 may further include various types of computing apparatus to facilitate the performance of the communications functions. In an example, the embedded modem 108 may include one or more processors 114 configured to execute computer instructions, and a storage medium 116 on which the computer-executable instructions and/or data may be maintained. A computer-readable storage medium 116 (also referred to as a processor-readable medium 116 or storage 116) includes any non-transitory (e.g., tangible) medium that participates in providing data (e.g., instructions) that may be read by a computer (e.g., by the processor(s) 114). In general, a processor 114 receives instructions and/or data, e.g., from the storage 116, etc., to a memory 118 and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

Each of the ECUs 104 may also include one or more processors 114 and memories 118 (not shown) for performing the functions of the ECUs 104 described above. Moreover, each of the ECUs 104 may also include its own storage on which computer-executable instructions and/or data may be maintained. These storages of the ECUs 104 may be referred to herein as auxiliary storage 120. For instance, the powertrain controller ECU 104-A may include an auxiliary storage 120-A, the body controller ECU 104-B may include an auxiliary storage 120-B, the brake controller ECU 104-C may include an auxiliary storage 120-C, the power steering controller ECU 104-D may include an auxiliary storage 120-D, the climate control management ECU 104-E may include an auxiliary storage 120-E, the global positioning system (GPS) ECU 104-F may include an auxiliary storage 120-F, and the application interface controller 104-G may include an auxiliary storage 120-G.

The auxiliary storage application 122 may be one application included on the storage 116 of the embedded modem 108. The auxiliary storage application 122 may include instructions that, when executed by the processor 114 of the embedded modem 108, cause the embedded modem 108 to use the auxiliary storages 120 of the ECUs 104 to provide additional storage capacity to the embedded modem 108 beyond that of the storage 116 of the embedded modem 108. For example, the auxiliary storage application 122 may allow the embedded modem 108 to use the auxiliary storages 120 to offload storage of voluminous diagnostic data 126 to be provided to the remote telematics server 136, or to store large software updates that are of a size in excess of the storage capacity of the storage 116.

In some examples, the embedded modem 108 may further include the priority list 128. The priority list 128 may include identifiers or other indications representative of which ECUs 104 are deemed higher priority for storage. In one example, the priority list 128 may include a listing of identifiers of a subset of the controllers predefined to be preferred for the embedded modem 108 to use for storage. In another example, the priority list 128 may include an ordered listing of identifiers of a subset of the controllers in a predefined order (or predefined decreasing order) of priority for use by the embedded modem 108 for storage.

Figure 2:
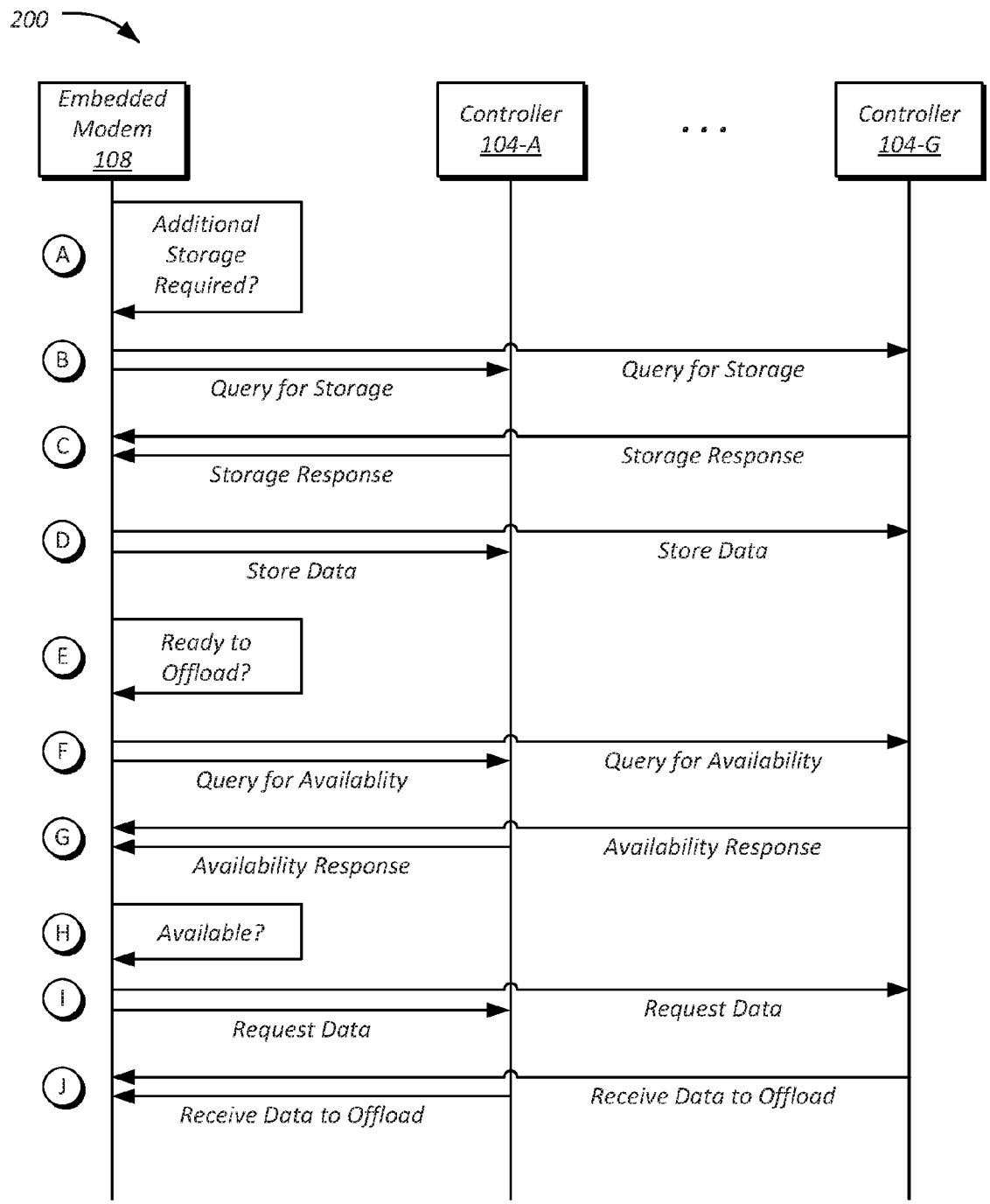
FIG. 2 illustrates an example data flow of the embedded modem using electronic control unit auxiliary storage within the vehicle.

FIG. 2 illustrates an example data flow 200 of the embedded modem 108 using ECU 104 auxiliary storage 120 within the vehicle 102. In the example data flow 200, the embedded modem 108 queries the ECUs 104 for auxiliary storage 120 to store received data, and stores the data to the auxiliary storage 120 based on responses to the query. When the data is ready to be offloaded, the embedded modem 108 queries the ECUs 104 holding the data to ensure their statuses are appropriate for data offload. If so, the embedded modem 108 retrieves the data from the ECUs 104 and transmits the data out. It should be noted that the data flow 200 is explanatory, and the operations of the data flow 200 may be performed in various orders. For example, the operations at the various time indices may be performed concurrently, in loops, or in different orderings than shown in the data flow 200.

More specifically, at time index (A), the embedded modem 108 determines whether additional storage is required. For instance, the embedded modem 108 may identify that the storage 116 of the embedded modem 108 lacks sufficient available space to store diagnostic data 126 to be offloaded from the vehicle 102. As another possibility, the embedded modem 108 may always attempt to offload certain types of data, or to store all data to auxiliary storage 120 when possible to preserve the storage 116 of the embedded modem 108 (e.g., for use in processing commands from users such as unlock door commands). If additional storage is required, the data flow continues. Otherwise the data flow ends.

At time index (B), the embedded modem 108 queries the ECUs 104 to identify whether the ECUs 104 have auxiliary storage 120 available. In an example, the embedded modem 108 broadcasts a message over the vehicle bus 106 requesting the ECUs 104 to reply with their available storage capacity. In another example, the embedded modem 108 may send messages addressed to specific ECUs 104 individually.

At time index (C), the embedded modem 108 receives storage responses from the ECUs 104 over the vehicle bus 106. In an example, the storage responses may indicate an amount of storage that is available at the responding ECU 104 (e.g., a number of bytes or kilobytes available). In another example, the storage responses may indicate whether or not storage is available. In such examples, the embedded modem 108 may further query the responding ECUs 104 for the quantity of available storage.

At time index (D), the embedded modem 108 stores data to the ECUs 104. In an example, the embedded modem 108 sends the data over the vehicle bus 106 to the ECUs 104 for storage. As one possibility, the embedded modem 108 first sends data to one of the ECUs 104, and responsive to that ECU 104 reaching the limit of the available storage indicated by that ECU 104, the embedded modem 108 transitions to sending the data to a second one of the ECUs 104. The embedded modem 108 may continue this process until the data is distributed.

In some examples, the embedded modem 108 may store data to the ECUs 104 based on the priority list 128. For instance, using the priority list 128 certain ECUs 104 may be given higher priority in storing data than other ECUs 104. As one possibility, the application interface controller 104-G may have precedence over other ECUs 104. As another possibility, data may be allocated to the ECUs 104 in order of which ECUs 104 have the most available storage. For instance, the ECU 104 with the most available storage may be used first, followed by the ECU 104 with the next largest available amount of storage.

At time index (E), the embedded modem 108 determines whether the data is ready to be offloaded from the vehicle 102. In an example, the embedded modem 108 may determine to offload the data responsive to various conditions. For instance, the offloading may be performed periodically, responsive to a receipt of a message from the telematics server, upon a set of requested data having been captured, or upon the amount of data reaching a predefined threshold amount. The data flow continues when the data is ready to be offloaded.

At time index (F), the embedded modem 108 determines whether the ECUs 104 storing the data are available to provide the stored data back to the embedded modem 108. In an example, the embedded modem 108 broadcasts a message over the vehicle bus 106 requesting the ECUs 104 to reply with their available storage capacity. In another example, the embedded modem 108 may send messages addressed to the specific ECUs 104 to which the embedded modem 108 sent the data to be stored.

At time index (G), the embedded modem 108 receives availability responses from the ECUs 104 over the vehicle bus 106. In an example, the storage responses may indicate whether the ECUs 104 are available to send the data back to the embedded modem 108. For instance, if an ECU 104 is performing a task in support of the vehicle 102 being in a motive mode, the ECU 104 may send a response to the embedded modem 108 indicating that the ECU 104 is unavailable and to send the data back to avoid adding a resource burden to the ECU 104. In other examples, if the ECU 104 is available to return the data, the ECU 104 may return a positive availability response.

At time index (H), based on the availability responses the embedded modem 108 determines whether to proceed with the data transfer. Accordingly, the data flow continues when the ECUs 104 storing the data are available to return the data to the embedded modem 108.

At time index (I), the embedded modem 108 requests the data from the ECUs 104. In an example, the embedded modem 108 requests the data from the ECUs 104 in sequence order of the data to be offloaded. This may allow the embedded modem 108 to more easily offload the data, without using the storage 116 of the embedded modem 108 to store data to be reordered before offload.

At time index (J), the embedded modem 108 offloads the data from the embedded modem 108. Accordingly, in an example the embedded modem 108 may send the stored data to the ECUs 104 to the telematics server 130.

Figure 3:
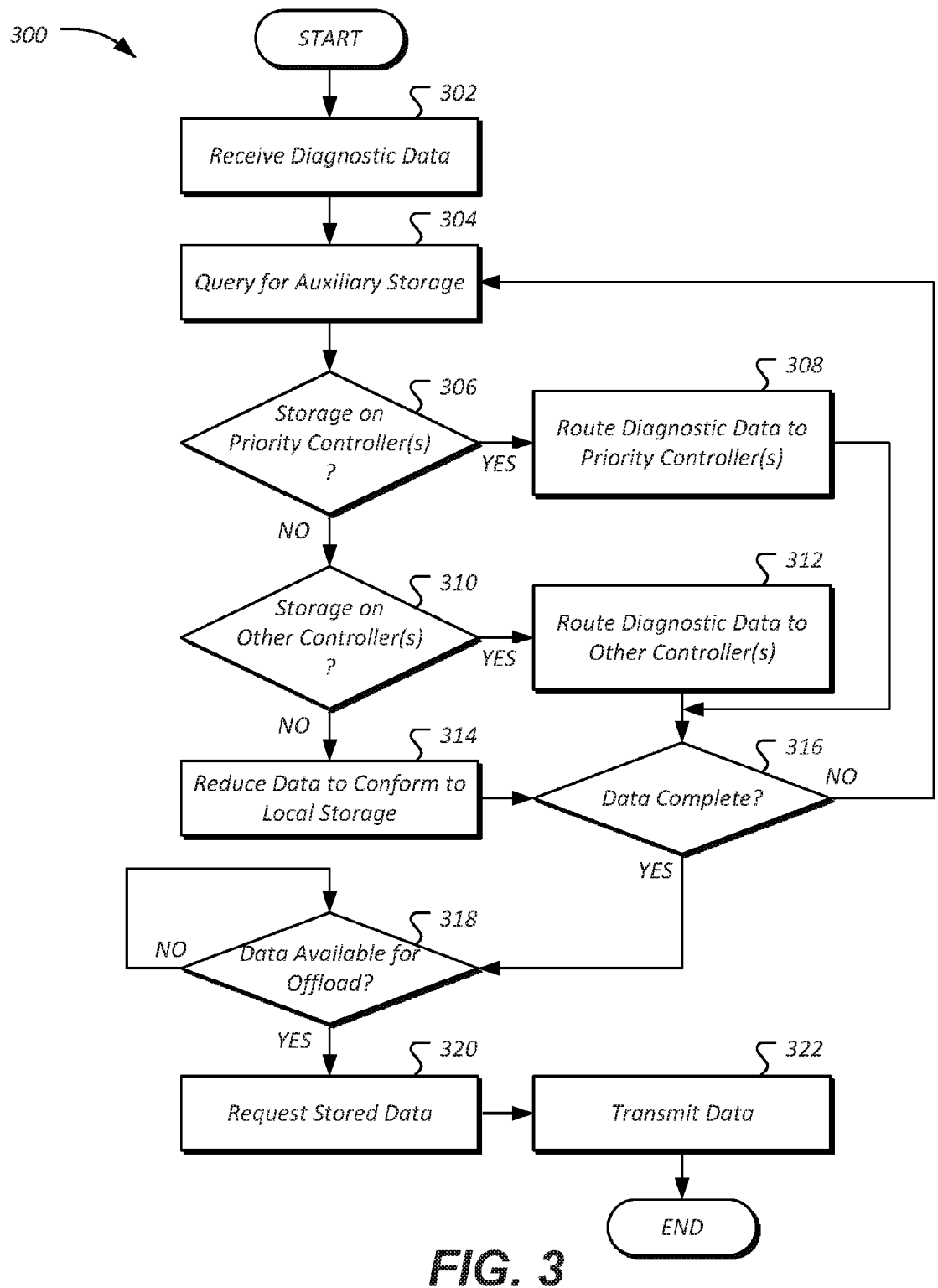
FIG. 3 illustrates an example process for the embedded modem using auxiliary storage of the ECUs.

FIG. 3 illustrates an example process 300 for the embedded modem 108 using auxiliary storage 120 of ECUs 104. In an example, the process 300 may be performed by the embedded modem 108.

At operation 302, the embedded modem 108 receives diagnostic data 126. At operation 304, the embedded modem 108 queries the ECUs 104 for auxiliary storage 120 that is available to store the received diagnostic data 126.

At operation 306, the embedded modem 108 determines whether auxiliary storage 120 is available on priority controllers. In an example, the embedded modem 108 may utilize the priority list 128 of identifiers of ECUs 104 to identify whether the identifiers of any ECUs 104 having available auxiliary storage 120 are preferred for storage over other controllers. As one possibility, the application interface controller 104-G may be a preferred controller. If auxiliary storage 120 is available on a priority ECUs 104, control passes to operation 308. Otherwise control passes to operation 310.

At operation 308, the embedded modem 108 routes the diagnostic data 126 to the priority ECU 104. In an example, the embedded modem 108 provides the data to the priority ECU 104 over the vehicle bus 106. After operation 308, control passes to operation 316.

At operation 310, the embedded modem 108 determines whether auxiliary storage 120 is available on other vehicle ECUs 104 than the priority ECUs 104. If so, control passes to operation 312. Otherwise control passes to operation 314.

At operation 312, the embedded modem 108 routes the diagnostic data 126 to the identified other vehicle ECUs 104. In an example, the embedded modem 108 provides the data over the vehicle bus 106. After operation 312, control passes to operation 316.

At operation 314, the embedded modem 108 reduces the diagnostic data 126 to conform to the limits of the storage 116 of the embedded modem 108. For instance, the embedded modem 108 may store a subset of diagnostic data 126 instead of all the diagnostic data 126 to be sent to the telematics server 130. In an example, the embedded modem 108 may perform decimation of diagnostic data 126, data compression techniques, and/or may limit low priority data from the diagnostic data 126.

At operation 316, the embedded modem 108 determines whether the diagnostic data 126 is complete. In an example, the embedded modem 108 may determine to offload the diagnostic data 126 responsive to various conditions. For instance, the embedded modem 108 may determine to offload the diagnostic data 126 periodically, responsive to a receipt of a message from the telematics server 130, or upon filling of the available storage of the embedded modem 108 and/or ECUs 104 to capacity. If the embedded modem 108 determines that the diagnostic data 126 is complete, control passes to operation 318. Otherwise, control returns to operation 302 to receive additional diagnostic data 126. Or, if more diagnostic data 126 remains to be placed, control may return to operation 304 to perform a further query for auxiliary storage 120 (not shown).

At operation 318, the embedded modem 108 determines whether the vehicle ECUs 104 are available to offload the diagnostic data 126. In an example, the embedded modem 108 may query the vehicle ECUs 104 for availability, an example of which is discussed above with respect to time indices (F), (G), and (H) of the data flow 200. If the vehicle ECUs 104 are available, control passes to operation 320. Otherwise, control remains at operation 318.

At operation 320, the embedded modem 108 requests the diagnostic data 126 from the vehicle ECUs 104. In an example, the embedded modem 108 may request and receive the diagnostic data 126 over the vehicle bus 106, an example of which is discussed above with respect to time indices (I) and (J) of the data flow 200. The received data may be temporarily maintained in the storage 116 of the embedded modem 108 for offloading.

At operation 322, the embedded modem 108 offloads the data to the telematics server 130. In an example, the embedded modem 108 may transmit the diagnostic data 126 over the communications network 112 to the telematics server 130 using the transceiver 124. After operation 322, the process 300 ends.

Accordingly, the embedded modem 108 may be able to query the vehicle ECUs 104 for auxiliary storage 120 to store data, store the data to the auxiliary storage 120, such that when the data is ready to be offloaded, the embedded modem 108 can retrieve the stored data for transmission. By using available storage capacity of other vehicle ECUs 104, the embedded modem 108 may accordingly be able to act on amounts of data in excess of the data capacity of the storage 116 of the embedded modem 108.

Variations on the disclosed systems and methods are possible. In another example, rather than collecting diagnostic data 126, the embedded modem 108 may utilize the auxiliary storage 120 of the vehicle ECUs 104 as an additional area for retrieving software updates or other files that exceed the capacity of the storage 116 of the embedded modem 108.

Computing devices described herein, such as the ECUs 104, embedded modem 108, and telematics server 130, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA, C, C++, C#, VISUAL BASIC, JAVA SCRIPT, PERL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   an embedded modem having an internal storage of a size insufficient to store received data, in communication over a vehicle bus with controllers each including data storage, programmed to
   query the controllers over the bus to identify controllers having available storage for the received data,
   if the available storage is located on a priority controller of the controllers, send the data over the bus to the priority controller for storage,
   otherwise, if the available storage is available on a non-priority controller of the controllers, send the data over the bus to the non-priority controller for storage,
   query the controllers over the bus to confirm that the controller storing the received data sent to the controller is available for data offload, including to confirm that the controllers are not operating in a motive mode, and
   responsive to the confirmation, request the stored data over the bus and transmit the stored data over a wide-area network to a telematics server.

2. The system of claim 1, wherein the embedded modem is further programmed to:

maintain a listing of identifiers of preferred controllers of the controllers, and identify a controller as being one of the preferred controllers according to an identifier of the identified controller being included in the listing.

3. The system of claim 1, wherein the data is diagnostic data to be offloaded over the wide-area network to the telematics server.

4. The system of claim 1, wherein the data is a software update received over the wide-area network from the telematics server.

5. The system of claim 1, wherein the embedded modem is further programmed to, if no available storage is located, reduce the data to conform to the size of the internal storage of the embedded modem.

6. A system comprising:

an embedded modem, in communication over a vehicle bus with controllers each including data storage, programmed to query the controllers over the bus to identify controllers having available storage for received data, if the available storage is located on a priority controller of the controllers, send the data over the bus to the priority controller for storage, otherwise, if the available storage is available on a non-priority controller of the controllers, send the data over the bus to the non-priority controller for storage, query the controllers over the bus to confirm that the controller storing the data sent to the controller is available for data offload including confirming that the controllers are not operating in a motive mode, and responsive to the confirmation, request the stored data over the bus and transmit the stored data over a wide-area network to a telematics server.

7. The system of claim 6, wherein to confirm that the controllers are available includes confirming that the controllers have available processor time to provide the data.

8. The system of claim 6, wherein the data is diagnostic data to be offloaded over the wide-area network to the telematics server.

9. The system of claim 6, wherein the data is a software update received over the wide-area network from the telematics server.

10. A method comprising:

querying, by an embedded modem, controllers over a vehicle bus to identify controllers having available storage for received data;

if the available storage is located on a priority controller of the controllers, sending the data over the bus to the priority controller for storage;

otherwise, if the available storage is available on a non-priority controller of the controllers, sending the data over the bus to the non-priority controller for storage;

querying the controllers over the bus to confirm that the controller storing the data sent to the controller is available for data offload including confirming that the controllers are not operating in a motive mode; and responsive to the confirmation, requesting the stored data over the bus and transmitting the stored data over a wide-area network to a telematics server.

11. The method of claim 10, further comprising confirming that the controllers are available by querying that the controllers have available processor time to provide the data.

12. The method of claim 10, wherein the data is diagnostic data to be offloaded over the wide-area network to the telematics server.

13. The method of claim 10, further comprising, if no available storage is located, reducing the data to conform to a size of an internal storage of the embedded modem.

* * * * *